US007664841B2

(12) United States Patent
Farmer et al.

(10) Patent No.: US 7,664,841 B2
(45) Date of Patent: Feb. 16, 2010

(54) SELECTIVE ACTIVATION OF TCP/IP LINK AND TRAFFIC

(75) Inventors: Jamie V. Farmer, Beacon, NY (US); Mark R. Gambino, Brewster, NY (US); Shu-Hui Warner, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 11/296,624

(22) Filed: Dec. 7, 2005

(65) Prior Publication Data
US 2007/0130307 A1   Jun. 7, 2007

(51) Int. Cl.
*G06F 15/173* (2006.01)

(52) U.S. Cl. .................... 709/223; 709/224; 709/220; 709/203

(58) Field of Classification Search ......... 709/223–225, 709/229, 208, 238, 220, 203
See application file for complete search history.

(56) References Cited

U.S. PATENT DOCUMENTS

| 5,249,270 | A | 9/1993 | Stewart et al. |
| 5,261,104 | A | 11/1993 | Bertram et al. |
| 5,859,978 | A | 1/1999 | Sonderegger et al. |
| 6,272,544 | B1 * | 8/2001 | Mullen ..................... 709/223 |
| 6,279,032 | B1 | 8/2001 | Short et al. |
| 6,763,378 | B1 | 7/2004 | Hamilton, II et al. |
| 6,782,428 | B1 * | 8/2004 | Gleeson et al. ............ 709/238 |
| 6,922,727 | B2 | 7/2005 | Banerjee |
| 6,934,952 | B2 | 8/2005 | Sarkar et al. |
| 7,072,953 | B1 * | 7/2006 | Davutoglu ................. 709/223 |
| 7,137,119 | B1 * | 11/2006 | Sankaranarayan et al. .. 718/103 |
| 7,366,768 | B2 * | 4/2008 | Deo et al. .................. 709/217 |
| 2002/0194350 | A1 * | 12/2002 | Lu et al. .................... 709/225 |
| 2004/0059772 | A1 | 3/2004 | Bieringer |
| 2005/0271048 | A1 * | 12/2005 | Casey ....................... 370/389 |
| 2006/0136928 | A1 * | 6/2006 | Crawford et al. ........... 718/105 |

FOREIGN PATENT DOCUMENTS

JP        7-44276        2/1995

* cited by examiner

*Primary Examiner*—Philip B Tran
(74) *Attorney, Agent, or Firm*—Scully, Scott, Murphy & Presser, P.C.; John E. Campbell

(57) ABSTRACT

Discloses is a method of selective activation of server applications in a computer network system. The computer network system includes a server computer, a plurality of client computers, a set of server applications loaded on the server computer, and a given protocol stack for managing activation of the server applications. The method comprises the steps of a system administrator defining a plurality of states for the network system and specifying conditions to determine whether or not each of the server applications can be activated in each of said states. The given protocol stack then manages activation of the server applications in accordance with said specified conditions.

20 Claims, 1 Drawing Sheet

SELECTIVE ACTIVATION OF TCP/IP LINK AND TRAFFIC

BACKGROUND OF THE INVENTION

1. Field of the Invention

This invention generally relates to computer networks, and more specifically, to computer networks having one or more server applications. Even more specifically, the invention relates to procedures for determining when such server applications can be activated.

2. Background Art

Computer networks have become very widespread and increasingly important to many types of enterprises including businesses, universities and government. In general, a computer network is two or more computers (or associated devices) that are connected by communication facilities. One type of computer network is a client/server network. A client/server network includes a server, which is a computer or a process that provides shared resources to users of the network, and a client, which is a computer or a process that accesses the shared network resources provided by the server using the communication facilities.

In general, a client in a client/server network obtains information from a server by sending a request to the server. When the server receives the request, a server application on the server fills the request by obtaining the requested information and sending the information through the network to the client. The Internet (via the World Wide Web (WWW)) is an example of a client/server network. The Internet is a public wide-area network (WAN) environment that enables a client to request and receive data located on a remote server.

The server computer includes a network adapter card that physically transmits and receives packets of data between the server computer and a client computer over the network. The server computer also includes server applications that are software for manipulating data. For example, server applications may include database serving, file serving, and transaction processing. Each server application can access the network through the network adapter card. More specifically, an application process, which is made up of one or more threads, is connected to the network adapter card via a socket, which is a software object that allows a thread of a server application to communicate with a virtual port of the network adapter card.

In many servers, some aspects of these server applications are managed by a mechanism referred to as a stack, which is a prescribed hierarchy of protocols. These protocols may set forth conditions that must be met before a particular application can be started, and may determine priority among applications competing for resources. On servers that are connected to the internet, these protocol stacks are referred to as TCP/IP (Transmission Control Protocol/Internet Protocol) stacks.

For example, during system initialization, system resources and services are limited. This limitation prevents TCP/IP socket applications from being started until system initialization is completed. On most platforms, all socket applications can only be started when the system is initialized and the network is started. Some applications will not start correctly if configuration data needed by the application is not first uploaded from the remote systems. Examples of such configuration data are airline fare rules and current inventory/pricing data. Procedures of operators uploading data manually before starting the applications have proven to be error prone. The customer requirement is to be able to start certain system services during the system initialization process that interact with remote platforms. Besides uploading configuration data, another example is the need for remote operators to be able to access the server during the initialization process.

SUMMARY OF THE INVENTION

An object of this invention is to allow a server's system administrator of a computer network system to specify when a given server socket application is started.

Another object of the present invention is to enable a system administrator of a computer network system to define several system states and to specify when a given socket application can be started on the server.

A further object of the invention is to provide the capability for a server of a computer network system to start a subset of socket applications during system initialization.

Another object of this invention is to provide a capability, in a computer network system, that allows actions like system configuration data and application data to be uploaded from a remote system, and also enables remote operators to access a server during the initialization process to perform actions necessary to complete system initialization.

These and other objectives are attained with a method of selective activation of server applications in a computer network system. The computer network system includes a server computer, a plurality of client computers, a set of server applications loaded on the server computer, and a given protocol stack for managing activation of the server applications. The method comprises the steps of a system administrator defining a plurality of states for the network system and specifying conditions to determine whether or not each of the server applications can be activated in each of said states. The given protocol stack then manages activation of the server applications in accordance with said specified conditions.

The preferred embodiment of the invention, described in detail below, allows the system administrator to define several system states and to specify when a given socket application can be started in a given state. The TCP/IP stack will not allow an application to be started before its defined minimum system state is reached. This invention can be integrated into Internet Daemon (INETD) such that INETD will automatically start the application when its required minimum system state is reached. The application can also be started manually, or by any other method, after the minimum system state is reached.

For example, to upload a configuration file for an application via FTP before the application is started, FTP can be started in a system state before the application which needs the configuration file is allowed to be started. Another example is using this invention for handling overload situations and limiting traffic to high priority applications. For example, a server could have system states (lowest to highest) RESTRICTED, HIGH_PRIORITY_ONLY, LIMITED_TRAFFIC, and NORMAL.

The system is in RESTRICTED state during initialization. Only certain applications (like FTP and remote operator command facility) are allowed to run. After initialization completes, the system reaches NORMAL state where all applications can run. If the system is in NORMAL state and reaches a certain resource threshold (based on CPU usage, memory usage, or other user defined criteria), the system drops to LIMITED_TRAFFIC state to prevent some applications from running. IF resources are further depleted, the system drops to HIGH_PRIORITY_ONLY state to limit traffic to just the highest priority applications.

Further benefits and advantages of the invention will become apparent from a consideration of the following

DETAILED DESCRIPTION OF THE PREFERRED EMBODIMENTS

Figure 1:
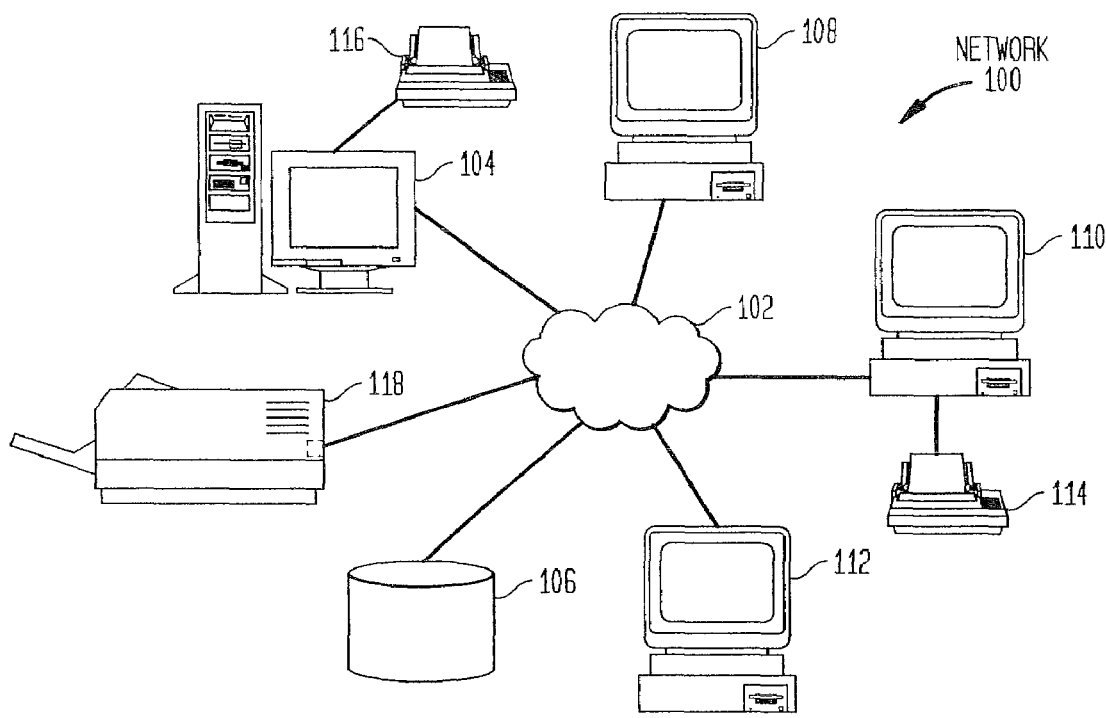
FIG. 1 illustrates a computer network system with which the present invention may be employed.

FIG. 1 illustrates a distributed data processing system 100, which is a network of computers, in which the present invention may be implemented. Process system 100 includes a network 102, which is the medium used to provide communication links between various devices and computers connected within the data processing system 100. Network 102 may include permanent connections, such as wire or fiber optic cables, or temporary connections made through telephone connections. Connections are made via pathways, known as ports into and out of computers. In the depicted example, server 104 is connected to network 102, along with storage unit 106. In addition, clients 108, 110 and 112 are also connected to network 102. These clients, 108, 110 and 112, may be, for example, personal computers or network computers.

A network computer is considered as any computer coupled to a network that receives a program or other application from another computer coupled to the network. In the depicted example, server 104 provides data, such as boot files, operating system images and applications, to clients 108-112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
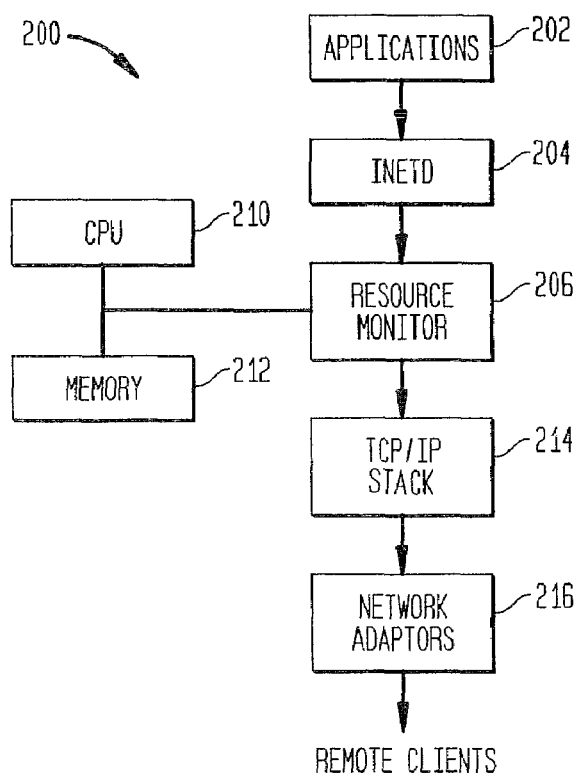
FIG. 2 is a simplified block diagram of a server of the system of FIG. 1 and incorporating the present invention.

Referring to FIG. 2, a simplified block diagram of a data processing system 200 which may be implemented as a server, such as server 104 in FIG. 1, is depicted in accordance with the present invention. Server 200, as shown in FIG. 2, includes applications 202, INETD 204, resource monitor 206 (to check CPU 210, memory 212, and other resources within the server), TCP/IP stack 214, and network adapters 216. Messages from remote clients flow into the server through the network adapter, then go into the TCP/IP stack, which interfaces with the resource monitor to determine, based on the priority assigned to the application or socket, whether there are enough available resources to pass the message to the application. If yes, the message is passed to the application for processing. If not, the message is queued internally within the TCP/IP stack until the necessary resources become available (the TCP/IP stack also has the option of discarding the "lower priority" message). In other words, the TCP/IP stack makes it look to the application like no data has arrived from the network while the server is not in NORMAL state.

Those of ordinary skill in the art will appreciate that the server computer 200 may include additional or alternative elements not shown in FIG. 2. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

The server applications 202 may include database serving, file serving, and transaction processing. TCP/IP stack 214 is provided to manage certain aspects of the server applications, and for example, the stack 214 may determine or identify minimum conditions that must be satisfied before a particular application can be started, and may determine the sockets to which the applications are connected.

Figure 3:
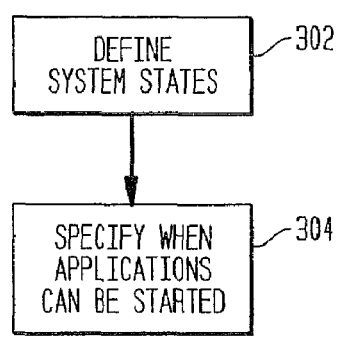
FIG. 3 represents a selective activation in accordance with this invention.

In accordance with the present invention, an administrator of system 100 is provided with the ability to specify when a given server socket application is started (for example, during system initialization or only after initialization is complete). To do this, with reference to FIG. 3, the administrator, at 302, defines several system states and, at 304, specifies in which of these states a given server socket application can be started. The TCP/IP stack will not allow an application to be started before its defined minimum system state is reached.

For example, to upload a configuration file for an application via FTP before the application is started, FTP can be started in a system state before the application which needs the configuration file is allowed to be started. Another example is using this invention for handling overload situations and limiting traffic to high priority applications. For example, a server could have system states (lowest to highest) RESTRICTED, HIGH_PRIORITY_ONLY, LIMITED_TRAFFIC, and NORMAL.

The system is in RESTRICTED state during initialization. Only certain applications (like FTP and remote console) are allowed to run. After initialization completes, the system reaches NORMAL state where applications can run. If the system is in NORMAL state and reaches a certain resource threshold, the system drops to LIMITED_TRAFFIC state to prevent the input messages from being delivered by the TCP/IP stack to lower priority applications. If resources are further depleted, the system drops to HIGH_PRIORITY_ONLY state to limit traffic to just the highest priority applications.

An important feature of the preferred embodiment of the invention is that priority is not just at the application level. For example, instead of assigning high priority to all clients connected to application X, different priorities can be assigned to different clients such that some clients connected to application X are high priority and other clients are lower priority. This is important because a server application might have connections with many business partners, some of which are key partners that require processing at all times. The priority value is assigned by the server (server system administrator, or server application)—priority values are not assigned by the client node/application. The priority value does not flow as part of the message itself. Priority in this instance refers to the priority at which the message can be processed by the server node. This priority value is not the network priority value, meaning the priority value assigned by the server does not impact how messages flow in the network. There are other methods/protocols, such as Differentiated Services, that can be used to assign messages different priorities as they flow in the network.

The present invention can be integrated into Internet Daemon (INETD) such that INETD will automatically start an application when its required minimum system state is reached. The application can also be started manually, or by any other method, after the minimum system state is reached.

The preferred embodiment of the invention provides a number of important advantages. For example, this invention provides a capability for a server to start a subset of socket applications during system initialization. This allows actions like system configuration data and application data to be uploaded from the remote systems. This capability also enables remote operators to access the server during the initialization process to perform actions necessary to complete system initialization.

A major difference between this invention and implementations on other platforms is that this invention allows for traffic to be read in from the network, even when the server is low on resources. On most systems, if the server runs low on resources, the server prevents new traffic from arriving—stops reading from the network adapter. With this invention, traffic is read in and high priority messages continue to the processed. These high priority messages may allow applications to free up resources, or may be remote operator commands to fix a stalled device, again that would free up resources and allow the server to return to NORMAL state.

Another important aspect of this invention is that it may be effectively used to reduce lost messages and to improve error recovery processing (such as retransmitted messages). On traditional servers, if the server stops reading from the network adapter, packets destined for the server are discarded. This causes timeout conditions on the remote clients, which then triggers the clients to retransmit those messages. This results in increased network traffic. This also can result in response time delays for the end user (client). For example, at a time 0, the server runs low on resources and stops reading from the network adapter. At time 0.1 seconds, a message from the client arrives at the server network adapter and is discarded because the adapter's buffers are full. At time 0.3 seconds, resources become available and the server starts reading from the network adapter again. It takes until time 1.5 seconds for the client to timeout (because the client message was not acknowledged by the server) and retransmit the message. The retransmitted message arrives at the server at time 1.6 seconds, then the response message arrives back at the client at time 1.7 seconds and the transaction is completed.

With the present invention, using the same example, the transaction is completed much faster. Specifically, in this example, at time 0.1 seconds, a message from the client arrives at the network adapter and is read in by the server. This message is for a lower priority application/socket; therefore, the server queues this message internally. At time 0.3 seconds, resources become available again so the server begins processing the queued messages. The server application sends the response message which arrives at the client at time 0.4 seconds and the transaction is completed. In the old model, it took 1.7 seconds to complete the transaction (and the message had to be sent twice)—with the present invention, in contrast, it only takes 0.4 seconds (with the message only sent once).

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of selective activation of server applications on a server computer in a computer network system, said computer network system including a server computer, a plurality of client computers, a set of server applications loaded on the server computer, and a given protocol stack for managing activation of the server applications, the method comprising the steps of:
   (a) a system administrator defining a plurality of states for the network system;
   (b) said system administrator specifying conditions to determine whether or not each of the server applications can be activated in each of said states;
   (c) said given protocol stack managing activation of the server applications in accordance with said specified conditions;
   (d) assigning different priorities to the server applications;
   (e) the server computer receiving messages from the client computers; and
   (f) the protocol stack receiving the messages and determining, for each of the messages received by the server computer, whether to pass said each message to one of the server applications on the server computer based on the priority assigned to said one of the server applications.

2. A method according to claim 1, wherein:
   the network system periodically undergoes initialization; and
   step (b) includes the step of specifying a subset of the server applications as applications that can be activated during said system initialization.

3. A method according to claim 1, wherein the specified conditions include minimum conditions that must be satisfied before each of at least some of the applications can be activated in at least one of said states.

4. A method according to claim 3, wherein the given protocol stack prevents an application from staffing before a defined minimum system state is reached.

5. A method according to claim 1, wherein:
said states include a restricted state, a limited traffic state, and a normal state:
in the restricted state, only certain applications are allowed to run;
in the limited traffic state, input messages are prevented from being delivered by the given protocol stack to lower priority applications;
in the normal state, all of the applications are allowed to run.

6. A method according to claim 5, wherein the server computer does not stop applications when transitioning from the normal state to the limited traffic state, and instead the protocol stack prevents messages from being delivered to lower priority applications.

7. A method according to claim 5, wherein:
step (b) includes the step of designating a subset of said applications as highest priority applications; and
said states further include a high priority state in which only said highest priority applications are allowed to run.

8. The method according to claim 1, wherein the different priorities are assigned by the server computer.

9. The method according to claim 1, wherein:
the determining includes the protocol stack determining, for said each message, whether there are enough available resources, based on the priority assigned to said one of the server applications, to pass said each message to said one of the server applications,
when the protocol stack determines for said each message that there are enough available resources to pass said each message to said one of the server applications, said each message is passed to said one of the server applications for processing;
when the protocol stack determines for said each message that there are not enough available resources to pass said each message to said one of the server applications, said each message is queued within the protocol stack; and
where enough resources become available, the server computer processes said each message; and
each of the server applications is connected to a plurality of the client computers, and each server application has a respective one priority for each of the client computers to which the server application is connected.

10. A computer network system including:
a sewer computer;
a plurality of client computers;
a set of server applications loaded on the server computer;
a given protocol stack for managing activation of the server applications;
means for enabling selective activation of the server applications, including
a. means for receiving input from a system administrator to define a plurality of states for the network system, and
b. means for receiving input from said system administrator to specify conditions to determine whether or not each of the sewer applications can be activated in each of said states; and
wherein said given protocol stack manages activation of the server applications in accordance with said specified conditions; and
wherein different priorities are assigned to the server applications, the server computer receives messages from the client computers, and the protocol stack receives the messages and determines, for each of the messages, received by the server computer, whether to pass said each messages to one of the server applications on the sewer computer based on the priority assigned to said one of the server applications.

11. A computer network system according to claim 10, wherein:
the network system periodically undergoes initialization; and
the means for receiving input from said system administrator to specify conditions includes means for receiving input from said system administrator specifying a subset of the server applications as applications that can be activated during said system initialization.

12. A computer network system according to claim 10, wherein the specified conditions include minimum conditions that must be satisfied before each of at least some of the applications can be activated in at least one of said states.

13. A computer network system according to claim 12, wherein the given protocol stack will not allow an application to be started before a defined minimum system state is reached.

14. A computer network system according to claim 10, wherein:
said states include a restricted state, a limited traffic state, and a normal state:
in the restricted state, only certain applications are allowed to run;
in the limited traffic state, input messages are prevented from being delivered by the given protocol stack to lower priority applications;
in the normal state, all of the applications are allowed to run.

15. A computer network system according to claim 14, wherein:
the means for receiving input from said system administrator to specify conditions includes means for receiving input from said system administrator designating a subset of said applications as highest priority applications; and
said states further include a high priority state in which only said highest priority applications are allowed to run.

16. A program storage device readable by machine, tangibly embodying a program of instructions executable by the machine to perform method steps for enabling selective activation of server applications on a server computer in a computer network system, said computer network system including a server computer, a plurality of client computers, a set of server applications loaded on the server computer, and a given protocol stack for managing activation of the server applications, the method steps comprising:
a. enabling a system administrator to define a plurality of states for the network system;
b. further enabling said system administrator to specify conditions to determine whether or not each of the server applications can be activated in each of said states;
c. said given protocol stack managing activation of the server applications in accordance with said specified conditions; and
d. assigning different priorities to the applications;

e. the server computer receiving messages from the client computers; and f. the protocol stack receiving the messages and determining, for each of the messages received by the server computer, whether to pass said each message to one of the server applications on the server computer based on the priority assigned to said one of the server applications.

17. A program storage device according to claim 16, wherein:

the network system periodically undergoes initialization; and step (b) includes the step of enabling the system administrator to specify a subset of the server applications as applications that can be activated during said system initialization.

18. A program storage device according to claim 16, wherein the specified conditions include minimum conditions that must be satisfied before each of at least some of the applications can be activated in at least one of said states.

19. A program storage device according to claim 16, wherein:

said states include a restricted state, a limited traffic state, and a normal state;

in the restricted state, only certain applications are allowed to run;

in the limited traffic state, input messages are prevented from being delivered by the given protocol stack to lower priority applications; and in the normal state, all of the applications are allowed to run.

20. A program storage device according to claim 19, wherein:

step (b) includes the step of enabling the system administrator to designate a subset of said applications as higher priority applications and another subset of said applications as lower priority applications; and said states further include a high priority state in which input messages are prevented from being delivered by the given protocol stack to lower priority applications.

* * * * *

UNITED STATES PATENT AND TRADEMARK OFFICE
CERTIFICATE OF CORRECTION

PATENT NO. : 7,664,841 B2
APPLICATION NO. : 11/296624
DATED : February 16, 2010
INVENTOR(S) : Farmer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 757 days.

Signed and Sealed this

Seventh Day of December, 2010

David J. Kappos
*Director of the United States Patent and Trademark Office*